US012105946B2

(12) United States Patent
De Leon et al.

(10) Patent No.: US 12,105,946 B2
(45) Date of Patent: *Oct. 1, 2024

(54) PRESENTATION AND CONTROL OF USER INTERACTION WITH A SLIDER-BASED USER INTERFACE ELEMENT

(71) Applicant: Capital One Services, LLC, McLean, VA (US)

(72) Inventors: Erik Jay Salazar De Leon, Richmond, VA (US); Thomas Dohan, Elmhurst, IL (US); Xiang Lan, South Orange, NJ (US); Jason Ferrell, Glen Allen, VA (US); Albert Berger, Arlington, VA (US); John Heiner, Midlothian, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/366,946

(22) Filed: Aug. 8, 2023

(65) Prior Publication Data

US 2023/0376191 A1 Nov. 23, 2023

Related U.S. Application Data

(63) Continuation of application No. 17/658,738, filed on Apr. 11, 2022, now Pat. No. 11,775,162.

(51) Int. Cl.
*G06F 3/04847* (2022.01)
*G06F 3/0488* (2022.01)
(Continued)

(52) U.S. Cl.
CPC ........ *G06F 3/04847* (2013.01); *G06F 3/0488* (2013.01); *G06F 21/36* (2013.01); *G06F 21/44* (2013.01); *G06F 2221/2115* (2013.01)

(58) Field of Classification Search
CPC .... G06F 3/04847; G06F 3/0488; G06F 21/36; G06F 21/44
See application file for complete search history.

(56) References Cited

U.S. PATENT DOCUMENTS 6,486,896 B1 * 11/2002 Ubillos ............... G06F 3/04855
715/830
10,250,734 B1 4/2019 Gordon et al.
(Continued)

OTHER PUBLICATIONS

Co-pending U.S. Appl. No. 17/658,738, inventors Leon; Erik Jay Salazar De et al., filed on Apr. 11, 2022.
(Continued)

*Primary Examiner* — Seth A Silverman
(74) *Attorney, Agent, or Firm* — Harrity & Harrity, LLP

(57) ABSTRACT

In some implementations, a system may transmit, to a user device associated with a user account, a first set of user interface (UI) data that indicates: a rectangular-shaped element, a track positioned on the rectangular-shaped element and having a first end and a second end, and an interaction element located at the first end of the track and slidable between the first and second ends of the track. The system may receive, from the user device, interaction data indicating an interaction, by a user of the user device, with the interaction element from the first end to the second end of the track. The system may transmit, to the user device, a second set of UI data that indicates: the rectangular-shaped element and an account identifier associated with the user account and positioned on the rectangular-shaped element.

20 Claims, 10 Drawing Sheets

(51) Int. Cl.
    *G06F 21/36*     (2013.01)
    *G06F 21/44*     (2013.01)

(56) References Cited

U.S. PATENT DOCUMENTS

| | | | |
|---|---|---|---|
| 11,328,359 B1* | 5/2022 | Dahm | G06F 3/0482 |
| 11,386,223 B1* | 7/2022 | Fakhraie | G06F 3/0482 |
| 2008/0034316 A1* | 2/2008 | Thoresson | G06F 3/04855 |
| | | | 715/781 |
| 2010/0251167 A1* | 9/2010 | DeLuca | G06F 3/0485 |
| | | | 345/173 |
| 2020/0117352 A1* | 4/2020 | Chan | G06F 3/04883 |
| 2021/0026975 A1 | 1/2021 | Austin et al. | |
| 2021/0318799 A1 | 10/2021 | Oh et al. | |

OTHER PUBLICATIONS

International Search Report and Written Opinion for Application No. PCT/US2023/064566, mailed on Jul. 7, 2023, 12 pages.

* cited by examiner

PRESENTATION AND CONTROL OF USER INTERACTION WITH A SLIDER-BASED USER INTERFACE ELEMENT

RELATED APPLICATION

This application is a continuation of U.S. patent application Ser. No. 17/658,738, filed Apr. 11, 2022, which is incorporated herein by reference in its entirety.

BACKGROUND

A display of a user device may display a user interface (e.g., a graphical user interface). The user interface may permit interactions between a user of the user device and the user device. In some cases, the user may interact with the user interface to operate and/or control the user device to produce a desired result. For example, the user may interact with the user interface of the user device to cause the user device to perform an action. Additionally, the user interface may provide information to the user.

SUMMARY

Some implementations described herein relate to a system for providing data for presentation of a slider-based user interface element. The system may include one or more memories and one or more processors communicatively coupled to the one or more memories. The one or more processors may be configured to transmit, to a user device associated with a user account, a first set of user interface data associated with the slider-based user interface element, wherein the first set of user interface data indicates a rectangular-shaped element of the slider-based user interface element, a track, of the slider-based user interface element, positioned on the rectangular-shaped element and having a first end and a second end, and an interaction element, of the slider-based user interface element, located at the first end of the track and slidable between the first end of the track and the second end of the track. The one or more processors may be configured to receive, from the user device, interaction data indicating an interaction, by a user of the user device, with the interaction element from the first end of the track to the second end of the track. The one or more processors may be configured to transmit, to the user device, a second set of user interface data associated with the slider-based user interface element, wherein the second set of user interface data indicates the rectangular-shaped element of the slider-based user interface element, and an account identifier associated with the user account, wherein the account identifier is positioned on the rectangular-shaped element.

Some implementations described herein relate to a method for providing data for presenting an interactive user interface element. The method may include transmitting, by a system and to a user device, account interface data indicating one or more account interface elements corresponding to one or more accounts of a user, wherein each account is associated with an account identifier having a plurality of alphanumeric characters. The method may include receiving, by the system and from the user device, selection data indicating a selection, by the user, of a selected account interface element, of the one or more account interface elements, corresponding to a selected account. The method may include transmitting, by the system and to the user device, a first set of user interface data associated with the interactive user interface element, wherein the first set of user interface data indicates a rectangular-shaped element of the interactive user interface element, a plurality of abstraction elements corresponding to all of the alphanumeric characters or a subset of the alphanumeric characters and positioned on the rectangular-shaped element, and an interaction element, of the interactive user interface element, positioned on the rectangular-shaped element. The method may include receiving, by the system and from the user device, interaction data indicating an interaction, by the user, with the interaction element. The method may include transmitting, by the system and to the user device, based on the interaction data, a second set of user interface data associated with the interactive user interface element, wherein the second set of user interface data indicates the rectangular-shaped element of the interactive user interface element, and the plurality of alphanumeric characters of the account identifier associated with the selected account, where the plurality of alphanumeric characters replace the plurality of abstraction elements on the rectangular-shaped element.

Some implementations described herein relate to a user device configured to present a slider-based user interface element. The user device may include a memory and one or more processors communicatively coupled to the memory. The one or more processors may be configured to present, on a user interface associated with a user account, a first user interface element including a rectangular-shaped element, a track positioned on the rectangular-shaped element and having a first end and a second end, and an interaction element located at the first end of the track and movable between the first end of the track and the second end of the track. The one or more processors may be configured to detect a user interaction, with the user device, that indicates the interaction element moving from the first end of the track to the second end of the track. The one or more processors may be configured to present, on the user interface and based on the user interaction, a second user interface element including the rectangular-shaped element, and an account identifier associated with the user account, wherein the account identifier is positioned on the rectangular-shaped element.

DETAILED DESCRIPTION

Figure 1A:
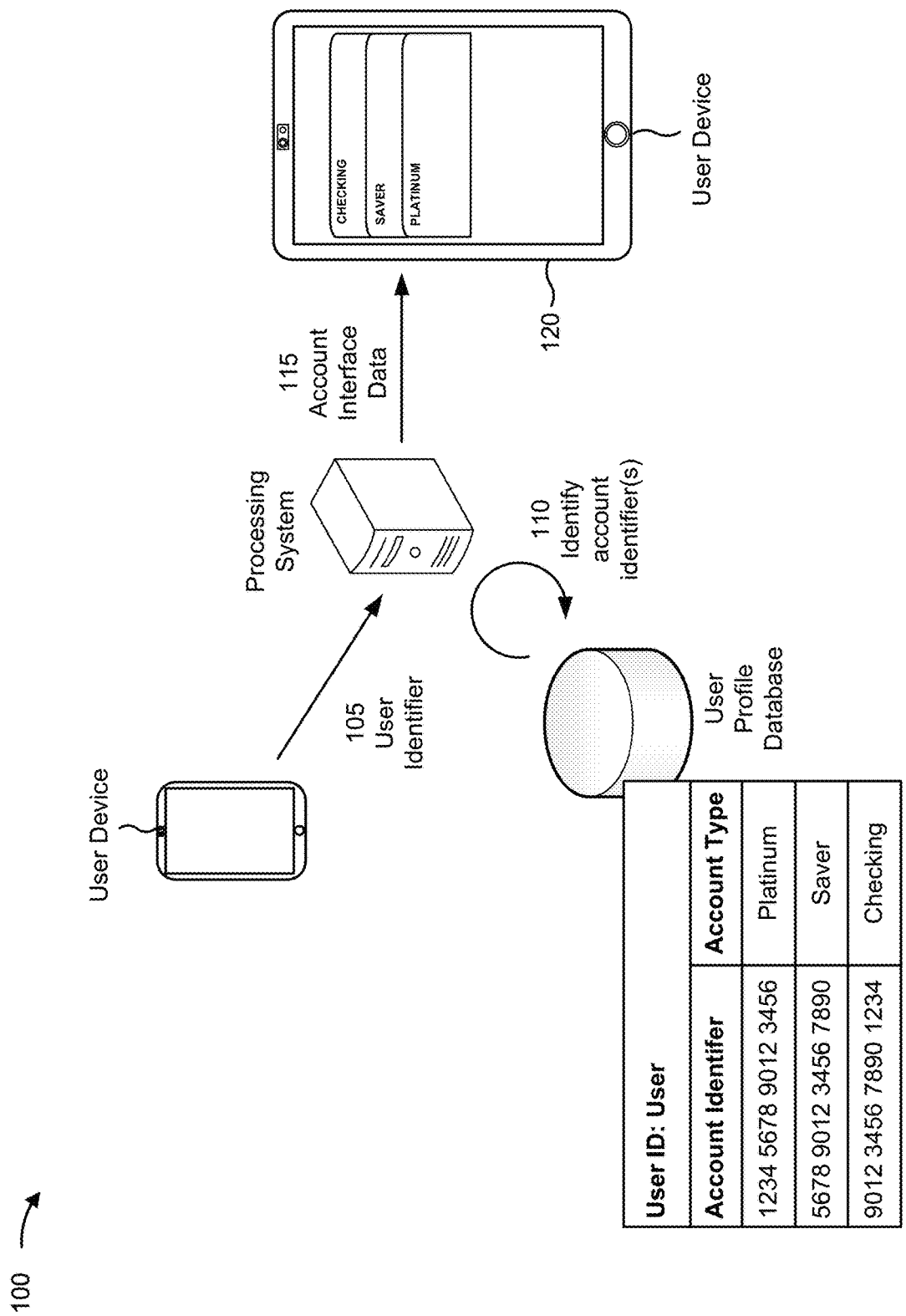
FIGS. 1A-1C are diagrams of an example implementation relating to presentation and control of user interaction with a slider-based user interface element.

The following detailed description of example implementations refers to the accompanying drawings. The same reference numbers in different drawings may identify the same or similar elements.

A user may have one or more accounts, each of which may have one or more account identifiers (e.g., an account number) associated with the particular account. The user may access a particular account via a user device (e.g., a mobile phone). To do so, the user often must log into a system that uses unique and/or secure login information (e.g., a username and a password), thereby offering a security measure via which only an authorized user (e.g., a person with the login information, such as the user) may access the particular account. After the user has successfully logged into the system and has accessed the particular account, account information associated with the particular account (e.g., the account identifier and/or historical interaction information) may be easily accessible. To provide some additional security, the system may limit the length of time that the user may be logged into the system (e.g., if the user is inactive for an amount of time). However, during the time that the user is logged into the system, the user may desire to have certain account information (e.g., the account identifier) not be easily accessible and/or visible. Accordingly, it is desirable to have a user interface (UI) that allows the user to access particular account information while providing additional security measures beyond the initial log in to the system.

Some implementations described herein enable a system to provide data for presentation of a UI element on a user device that provides account information (e.g., an account identifier) associated with a particular account of a user while providing an interactive feature requiring user interaction with the UI element in order to access the account information. The system may transmit, to the user device, a first set of UI data indicating a first UI element that may include a virtual card, such as a rectangular-shaped element. The virtual card may represent a physical card (e.g., a transaction card). The first UI element also may include a plurality of abstraction elements (e.g., symbols) positioned on the rectangular-shaped element and that hide the account identifier associated with the particular account. The first UI element further may include an interaction element. Upon an interaction by the user with the interaction element in a particular way (e.g., moving the interaction element in a particular direction), the system may transmit, to the user device, a second set of UI data indicating a second UI element. The second UI element may include the rectangular-shaped element and multiple characters (of the account identifier) that replace the abstraction elements on the rectangular-shaped element. By requiring user interaction with the interaction element in a particular manner to reveal the account identifier, the system is able to provide a security measure for making accessible sensitive account information (e.g., the account identifier).

Figure 1B:
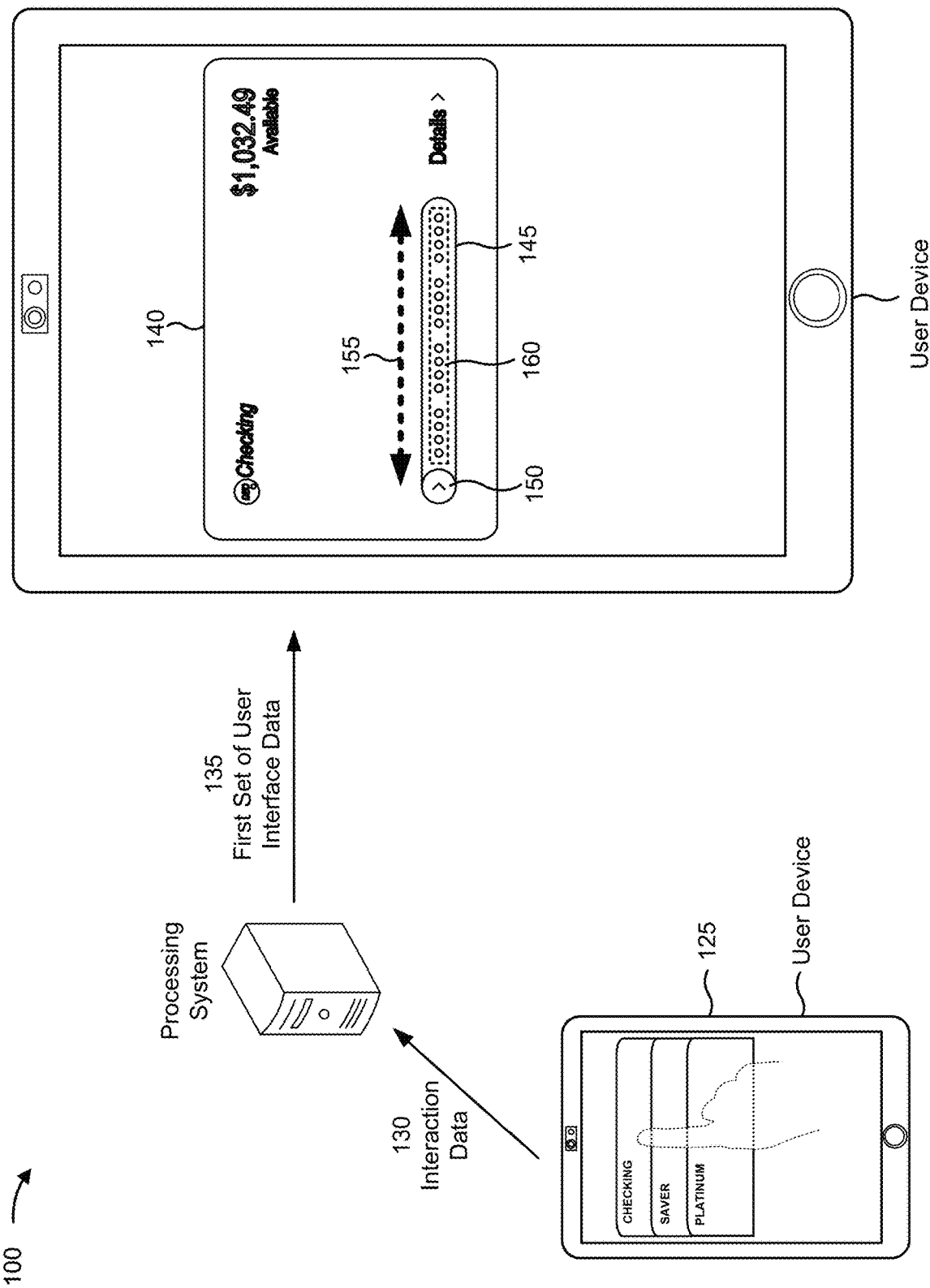
Figure 1C:
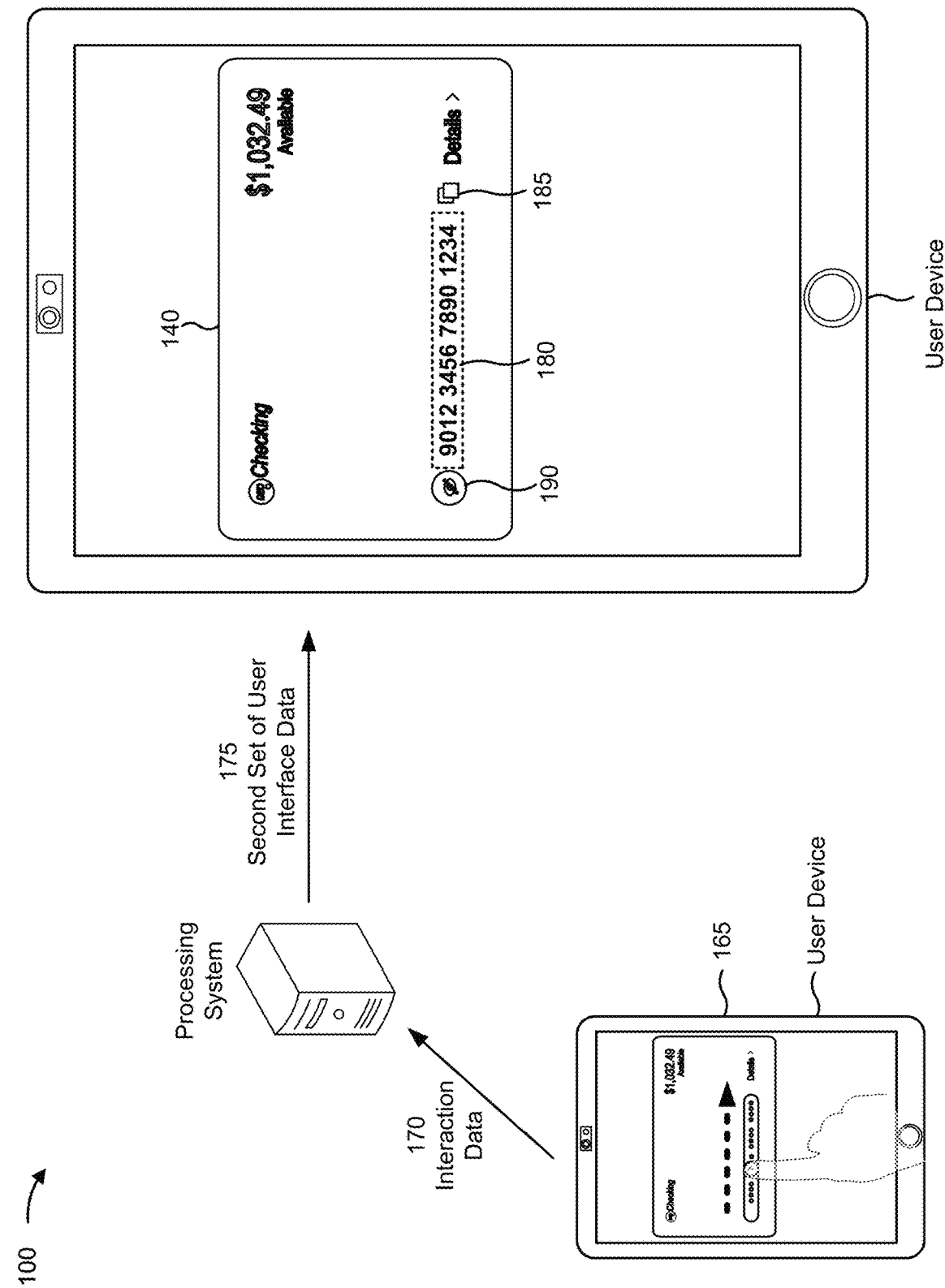

FIGS. 1A-1C are diagrams of an example 100 associated with presentation and control of user interaction with a slider-based UI element. As shown in FIGS. 1A-1C, example 100 includes a processing system, a user profile database, and a user device. These devices are described in more detail in connection with FIGS. 5 and 6.

As shown in FIG. 1A, a user may access an account of the user (e.g., a user account) via the user device, such as via an application installed on the user device or via a web-based application accessed on the user device over a network (as described in more detail below). The user and user account may be associated with a user identifier (e.g., the user's login or username) by which the user and user account may be identified. The user account may have one or more accounts (also referred to as sub-accounts), each particular sub-account having a unique account identifier (e.g., an account ID number, a primary account number (PAN), or a virtual card number associated with the particular sub-account. As shown by reference number 105, the user device may transmit, and the processing system may receive, the user identifier, such as when the user logs into the user account (e.g., via the application installed on the user device or via the web-based application).

As shown by reference number 110, based on the user identifier, the processing system may access account information associated with the user identifier and the user account (e.g., from the user profile database) and identify one or more account identifiers (e.g., an account ID number, a PAN, or a virtual card number) associated with the user identifier and the user account. Each account identifier may include a unique combination of characters (e.g., alphanumeric characters). The account identifiers may include any number of characters (e.g., fifteen or sixteen). Each account identifier may correspond to a different sub-account, and each of the different sub-accounts may be associated with a particular account type (e.g., a checking account type, a credit account type, a savings account type, or a rewards account type). Additionally, or alternatively, one or more of the account identifiers may have one or more parameters defining the use and/or access to the sub-account corresponding to the particular account identifier. For example, a particular account identifier may be usable in interactions (e.g., transactions) with one or more specific third parties (e.g., merchants or service providers), one or more specific types of interactions (e.g., interaction types) or categories of interactions (e.g., shopping, travel, dining, or entertainment), and/or have a limit on the number of uses in such interactions (e.g., a use threshold). Additionally, or alternatively, one or more of the account identifiers may be temporary and/or change based on time, location, and/or a particular third party.

For a user account that has more than one account identifier, the processing system may determine a primary account identifier of the multiple account identifiers. The multiple account identifiers may each have an importance level (e.g., a rank), and the primary account identifier may be the account identifier associated with the greatest importance level. The range of importance levels may be based on the number of account identifiers associated with the user account. For example, if the user account has three account identifiers, then the greatest importance level may be three, the second importance level may be two, and the lowest importance level may be one. The importance levels may be based on one or more factors (e.g., alert, account balance, impending action date, or account type). Each factor may be assigned a particular weight. For example, an account identifier that has been flagged with an alert may receive a high weight (e.g., 5). As another example, an account identifier that has an action date (e.g., a payment date) within a threshold time frame may receive a certain weight. The weight may depend on the threshold time frame. For example, an action date in 2 days may receive a high weight (e.g., 5), whereas an action date in 30 days may receive a low weight (e.g., 1). As another example, the different available account types may be assigned different weights. For example, a credit account type may receive a high weight (e.g., 3), a checking account type may receive an intermediate weight (e.g., 2), and a rewards account type may receive a low weight (e.g., 1). The weights of all of the factors for each account identifier may be totaled, and the importance level may be assigned in order of decreasing total (e.g., the account identifier with the highest total has the greatest importance level).

As shown by reference number 115, the processing system may transmit, and the user device may receive, account interface data, which may indicate one or more account interface elements corresponding to the one or more account identifiers and sub-accounts associated with the user identifier. As shown by reference number 120, the user device may display the account interface elements (e.g., on a display or UI of the user device). The account interface elements may be arranged (e.g., in a stack) in a particular order (e.g., based on respective importance level and/or with the account interface element corresponding to the primary account identifier being presented first in the order).

Each account interface element may be interactable by the user to select and access a particular sub-account. For example, as shown by reference number 125 in FIG. 1B, the user may select one of the account interface elements (e.g., by pressing the particular UI element on a touchscreen of the user device). The user device may detect the interaction with the selected account interface element. As shown by reference number 130, the processing system may receive, from the user device, interaction data indicating the selection, by the user, of the selected account interface element. The interaction data may include or be accompanied by the particular account identifier corresponding to the selected account interface element. Alternatively, the processing system may be able to determine the particular account identifier based on the selected account interface element indicated by the interaction data.

Based on the account identifier, the processing system may determine and/or generate a first set of UI data corresponding to the account identifier and indicating a first UI element of an interactive UI element (e.g., the slider-based UI element). As shown by reference number 135, the processing system may transmit, and the user device may receive, the first set of UI data. As shown in FIG. 1B, the first set of UI data may indicate a rectangular-shaped element 140 of the interactive UI element. In some implementations, the rectangular-shaped element 140 may have rounded corners, as shown in FIG. 1B. Alternatively, the rectangular-shaped element 140 may have square corners or chamfered corners. The rectangular-shaped element 140 may be a visual representation of a physical, rectangular-shaped card (e.g., a transaction card) associated with the account identifier.

The first set of UI data also may indicate a track 145, of the interactive UI element, positioned on the rectangular-shaped element 140 (e.g., within a bottom portion of the rectangular-shaped element 140, similar to a location of a card number on a physical card). The track 145 may extend linearly between a first end (e.g., a left-most end) and a second end (e.g., a right-most end) of the track 145. Alternatively, the track 145 may extend along any non-linear path (e.g., an arcuate path). The first set of UI data also may indicate an interaction element 150 located at the first end of the track 145. The interaction element 150 may be movable (e.g., slidable) between the first end of the track 145 and the second end of the track 145 (e.g., via interaction by the user, as described in more detail below). As shown by reference number 155, the interaction element 150 may be slidable in either direction along the track 145. Alternatively, the interaction element 150 may be slidable in a single direction along the track 145 (e.g., from the first end to the second end).

The first set of UI data further may indicate abstraction elements 160 of the interactive UI element. The abstraction elements 160 may serve as a security feature to hide the account identifier until the user interaction with the interaction element is detected, as described in more detail in connection with FIG. 1C. In some implementations, the abstraction elements 160 may be symbols (e.g., shapes). The abstraction elements 160 may correspond to all of the characters of the particular account identifier. For example, if the account identifier has fifteen numbers or sixteen, then the number of abstraction elements may also be fifteen or sixteen. Alternatively, the abstraction elements 160 may correspond to a subset of the characters, as described in more detail in connection with FIG. 2. The abstraction elements 160 may be positioned on the rectangular-shaped element 140 (e.g., on the track 145). Additionally, other information on the rectangular-shaped element 140, such as a card verification value (cvv) and/or an expiration date, may have corresponding abstraction elements.

As shown in FIG. 1C and by reference number 165, the user device may detect user interaction with the interaction element 150. As shown by reference number 170, the user device may transmit, and the processing system may receive, interaction data indicating the user interaction with the interaction element. In some implementations, the user device may transmit the interaction data when the user interaction indicates movement of the interaction element from the first end of the track to the second end of the track. Alternatively, the user interaction may be required to move the interaction element only partially along the track 145 or back and forth for a threshold number of times before transmitting the interaction data to the processing system. Additionally, or alternatively, the user interaction may be required to satisfy a pressure threshold and/or a speed threshold for moving the interaction element before the user device transmits the interaction data.

As shown by reference number 175, the processing system may transmit, and the user device may receive, a second set of UI data. As shown in FIG. 1C, the second set of UI data may indicate the rectangular-shaped element 140 of the slider-based UI element. The second set of UI data also may indicate the particular account identifier 180 associated with the user account and corresponding to the selected account interface element. The account identifier 180 may be positioned on the rectangular-shaped element 140 (e.g., in a same or similar position as a position of the track 145 on the rectangular-shaped element 140 indicated by the first set of UI data and shown in FIG. 1B). In some implementations, the characters of the account identifier 180 may replace the corresponding abstraction elements 160 on the rectangular-shaped element 140 (e.g., in their respective positions on the track 145). Alternatively, the user device may detect the user interaction while the interaction element is in progress from the first end of the track to the second end of the track. In such an implementation, a particular character of the account identifier may be revealed, as indicated by the second set of UI data, when the interaction data indicates that the interaction element, via the user interaction, has passed a particular abstraction element corresponding to the particular character. Additionally, or alternatively, in implementations in which the cvv and/or the expiration date are hidden by abstraction elements in the first set of UI data, the characters of the cvv and/or the expiration date may be revealed (e.g., replace the corresponding abstraction elements) in the second set of UI data, in a similar manner as with the characters of the account identifier 180.

In some implementations, after the processing system has received, from the user device, interaction data indicating the user interaction with the interaction element 150 from the first end of the track 145 to the second end, and before transmitting, to the user device, the second set of UI data, the processing system may initiate, based on receiving the interaction data, an authentication process (e.g., a multi-factor authentication and/or a biometric authentication process) to authenticate an identity of the user. For example, the processing system may transmit, to the user device, authentication UI data that indicates authentication prompts and/or inputs for the user to authenticate the user's identity. After the authentication process is completed (e.g., the processing system has confirmed the user's identity via the authentication process), the processing system may then transmit the second set of UI data to the user device. In some implementations, if the identity of the user has been authenticated within a threshold amount of time (e.g., 1 minute, 5 minutes, or 10 minutes) prior to receiving the interaction data, then the processing system may bypass the authentication process and proceed to transmit the second set of UI data to the user device after having received the interaction data.

In some implementations, the second set of UI data also may indicate one or more additional interaction elements (also each referred to as a second interaction element), which may be interactable by the user (e.g., selected via the touchscreen display of the user device). For example, one second interaction element may be a copy interaction element 185. The user device may detect a user interaction (e.g., a second user interaction), with the user device, that indicates the copy interaction element 185. Based on detecting the second user interaction, the user device may create a copy of data indicating the account identifier. Additionally, or alternatively, the user device may transmit, to the processing system, the copy of the data and/or the interaction data indicating the second user interaction, from which the processing system may then create a copy of data indicating the account identifier.

As another example, another second interaction element may be a hide interaction element 190. The user device may detect a user interaction (e.g., a second user interaction) with the hide interaction element 190. The user device may transmit, and the processing system may receive, corresponding interaction data (e.g., second interaction data) indicating the second user interaction. The processing system may then transmit, and the user device may receive, abstraction data indicating one or more abstraction elements to replace the account identifier 180 or a portion of the account identifier 180 (e.g., the corresponding characters of the account identifier 180), indicated by the second set of UI data, on the rectangular-shaped element 140.

Alternatively, the track 145 and the interaction element 150 may remain on the display or UI of the user device (e.g., the second set of UI data may indicate the track 145 and the interaction element 150). If the user device detects user interaction with the interaction element 150 from the second end of the track 145 to the first end of the track 145 (e.g., the user slides the interaction element 150 from the second end to the first end), the account identifier 180 may be replaced by one or more abstraction elements. For example, the processing system may transmit to the user device a third set of UI data indicating the abstraction elements. Alternatively, the abstraction elements may be indicated by the second set of UI data upon the detection of the user interaction with the interaction element. In such an implementation, the second set of UI data may indicate the abstraction elements after the user device detects that the interaction element has traversed the track 145 from the second end to the first end. Alternatively, the second set of UI data may indicate an abstraction element for each character of the account identifier after the user device detects that the interaction element has passed the particular character.

In some implementations, the second UI data may indicate one or more third party identifiers (e.g., a third party name and/or a third party icon or logo) corresponding to one or more third parties (e.g., a merchant or a service provider). Each third party identifier may be interactable (e.g., selectable) by the user. The user device may detect a user interaction with a particular third party identifier, indicating a selection, by the user, of a third party corresponding to the third party identifier. The user device may transmit, to the processing system, selection data indicating the user's selection of the third party. Based on receiving the selection data, the processing system may transmit, to a third party system of the third party, account data indicating the account identifier. The processing system may also transmit, to the third party system, user data (e.g., user name, address, age, and/or sex) and/or account data (e.g., an expiration date of a sub-account corresponding to the account identifier). For example, the third party may offer a subscription service, and the user's selection of the third party may indicate the user's desire to subscribe to the third party's subscription service. By transmitting the account identifier and additional data (e.g., user data and/or account data) to the third party system of the third party, the processing system may initiate and/or complete a sign-up process to the third party's subscription service.

Using the techniques described herein, a user device may present, on a UI, an interactive UI element (e.g., a slider-based UI element) that requires user-friendly interaction with an interaction element before providing sensitive account information (e.g., an account identifier associated with an account of the user). As a result, a system providing the sensitive account information is able to provide the user with a security measure for accessing such information so that the information is not easily accessed by an unauthorized individual.

As indicated above, FIGS. 1A-1C are provided as an example. Other examples may differ from what is described with regard to FIGS. 1A-1C. For example, although implementations are described herein in connection with the slider-based UI element having a rectangular-shaped element, techniques described herein may be used for any shape (e.g., a circle, oval, square, or non-geometric shape).

Figure 2:
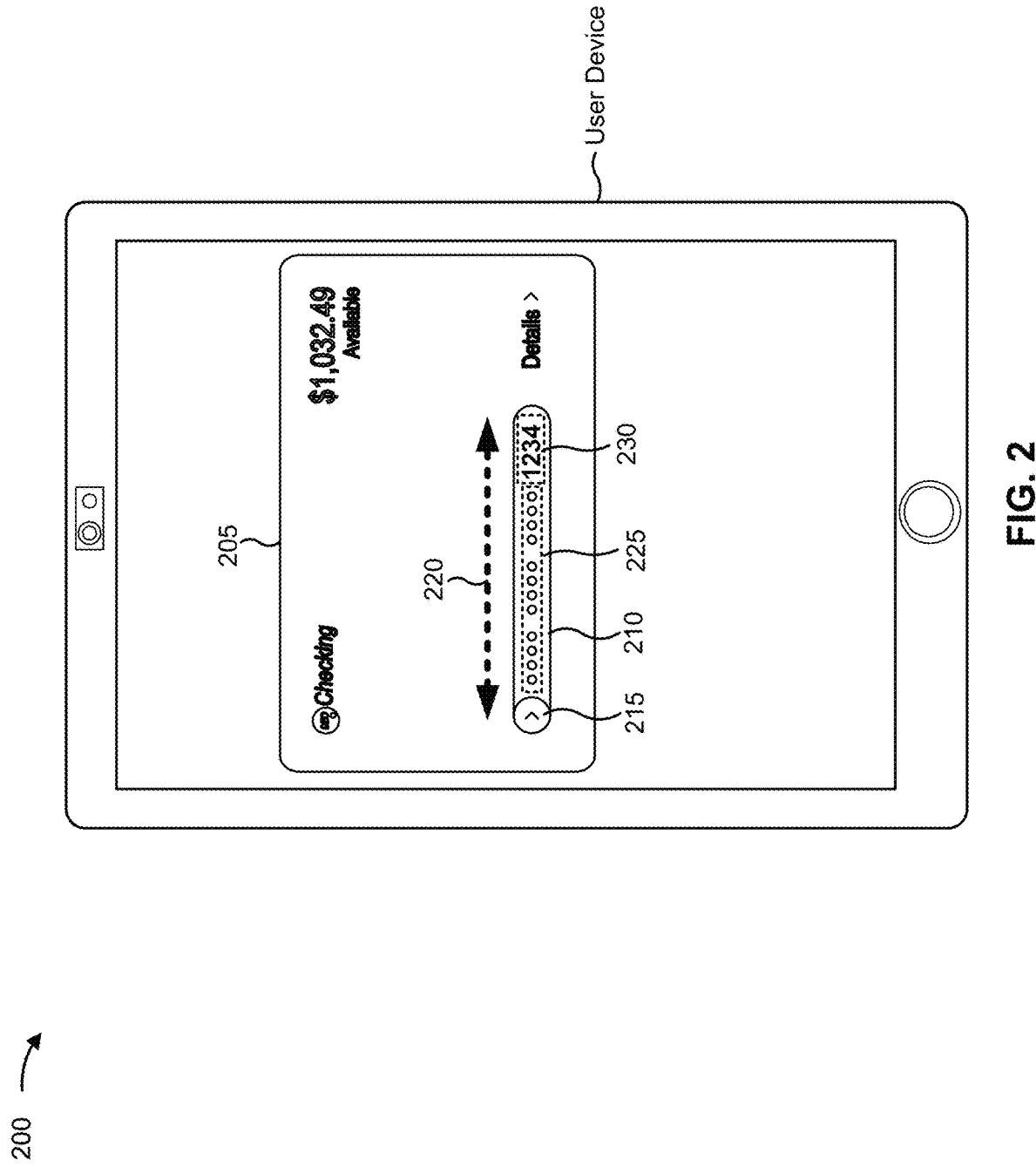
FIGS. 2-4 are diagrams of example implementations relating to presentation and control of user interaction with a slider-based user interface element.
Figure 3:
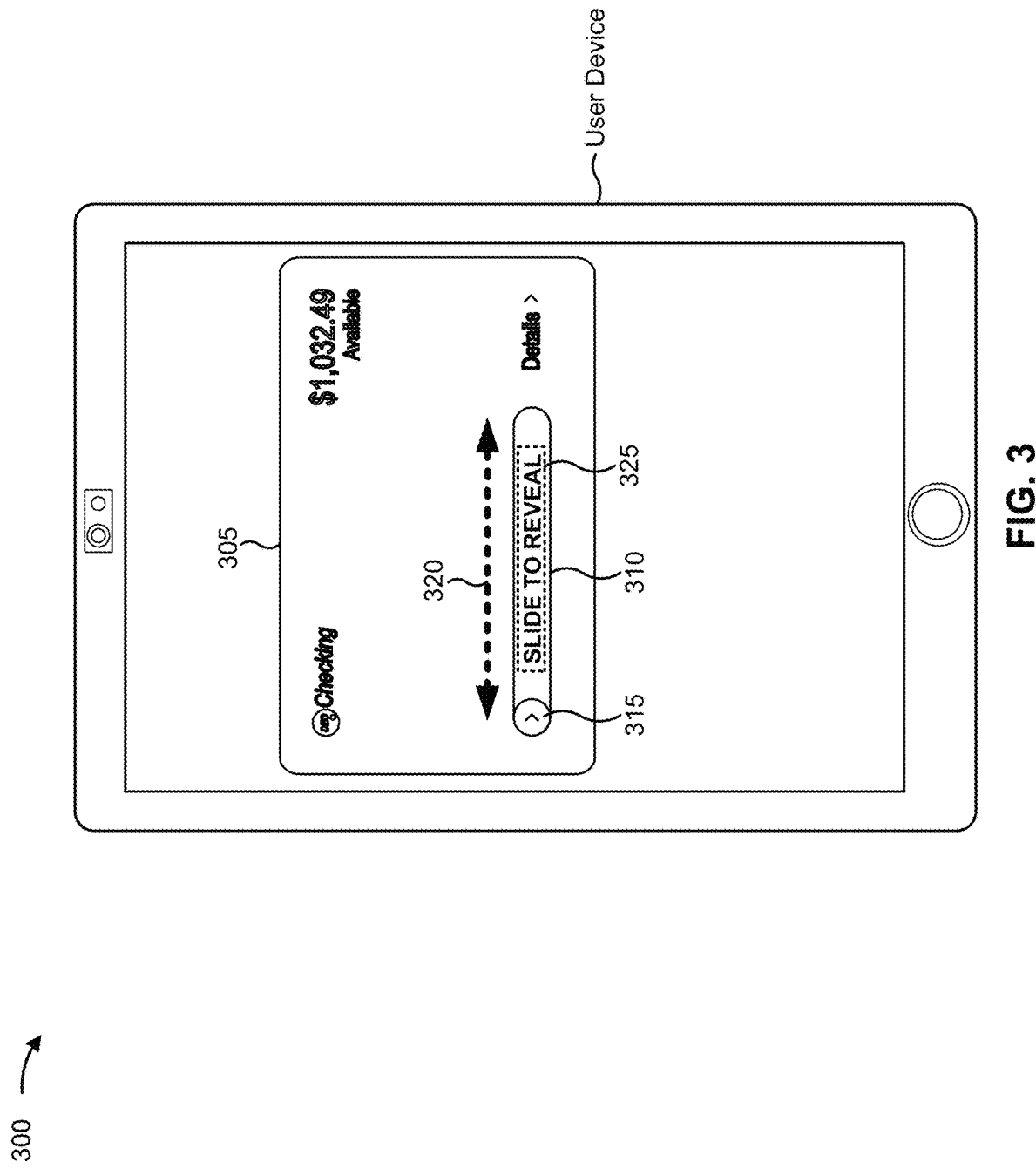
Figure 4:
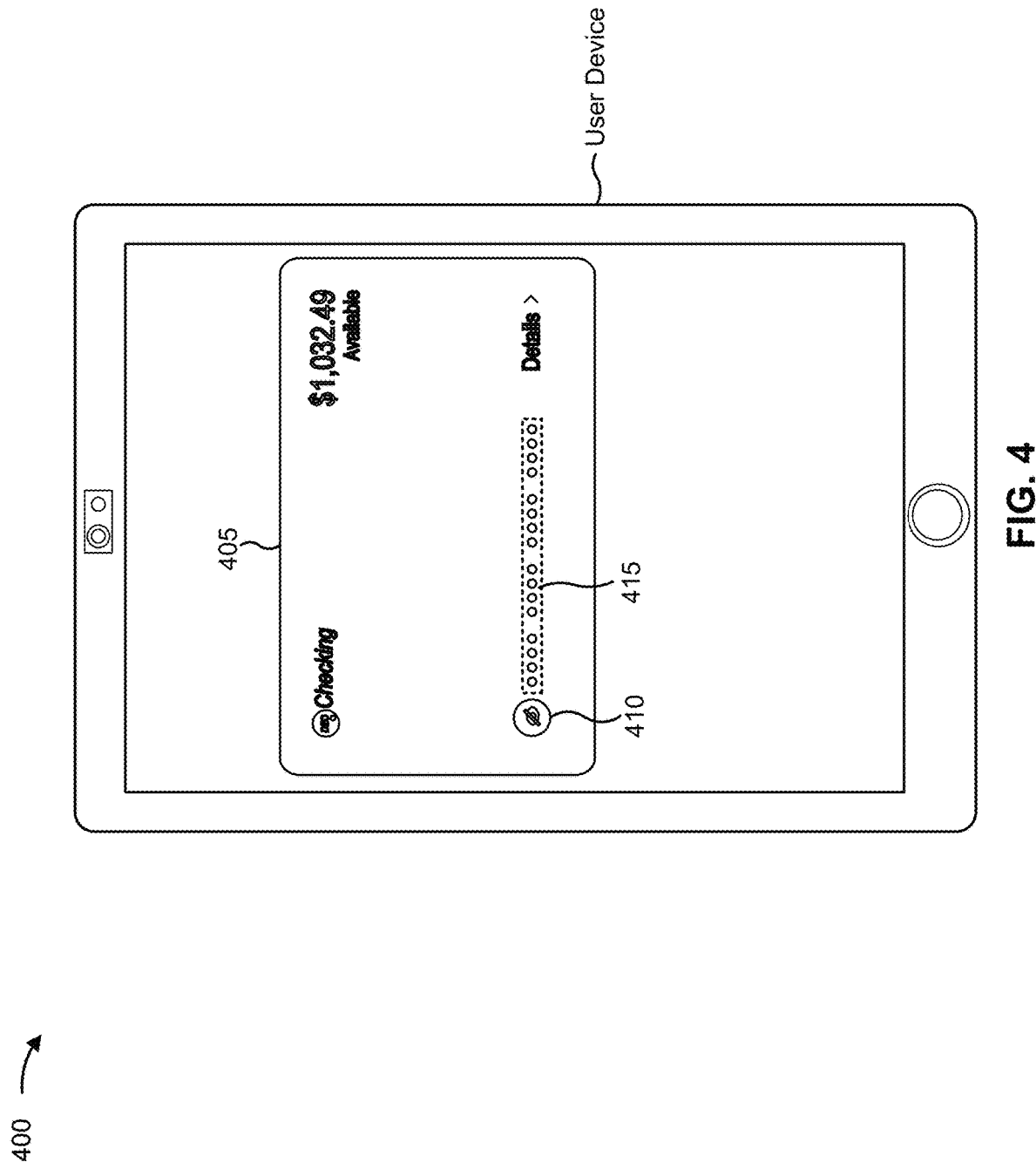

FIGS. 2-4 are diagrams of examples 200, 300, and 400 associated with presentation and control of user interaction with a first UI element of an interactive UI element (e.g., the slider-based UI element). As shown in FIGS. 2-4, example 100 includes a user device. The user device is described in more detail in connection with FIGS. 5 and 6.

As shown in FIG. 2, the first UI element may be similar to the first UI element of example 100. For example, the first UI element, as indicated by a first set of UI data, may include a rectangular-shaped element 205. In some implementations, the rectangular-shaped element 205 may have rounded corners, as shown in FIG. 2. Alternatively, the rectangular-shaped element 205 may have square corners or chamfered corners. The rectangular-shaped element 205 may be a visual representation of a physical, rectangular-shaped card (e.g., a transaction card) associated with an account identifier corresponding to an account or sub-account of a user.

The first UI element also may include a track 210 positioned on the rectangular-shaped element 205. The track 210 may extend linearly between a first end (e.g., a left-most end) and a second end (e.g., a right-most end) of the track 210. Alternatively, the track 210 may extend along any non-linear path (e.g., an arcuate path). The first UI element also may include an interaction element 215 located at the first end of the track 210. The interaction element 215 may be movable (e.g., slidable) between the first end of the track 210 and the second end of the track 210 (e.g., via interaction by the user, in a similar manner as with example 100, described above). As shown by reference number 220, the interaction element 215 may be slidable in either direction along the track 210. Alternatively, the interaction element 215 may be slidable in a single direction along the track 210 (e.g., from the first end to the second end).

The first UI element further may include abstraction elements 225. The abstraction elements 225 may serve as a security feature to hide the account identifier until the user interaction with the interaction element 215 is detected in the prescribed manner. The abstraction elements 225 may correspond to a subset of the characters of the particular account identifier. For example, if the account identifier has fifteen characters or sixteen characters, the number of abstraction elements 225 may be eleven or twelve, respectively, corresponding to the first eleven or twelve characters of the fifteen or sixteen characters. The remaining characters of the account identifier (e.g., the last four characters) may be shown with the abstraction elements 225 on the rectangular-shaped element 205 (e.g., on the track 210), as shown by reference number 230. Upon the user device detecting the user interaction with the interaction element 215 (e.g., sliding the interaction element 215 from the first end of the track 310 to the second end), the abstraction elements 225 may be replaced by the corresponding characters of the account identifier, in a similar manner as with example 100 described above.

As shown in FIG. 3, the first UI element may be similar to the first UI element of example 100. For example, the first UI element, as indicated by a first set of UI data, may include a rectangular-shaped element 305. In some implementations, the rectangular-shaped element 305 may have rounded corners, as shown in FIG. 3. Alternatively, the rectangular-shaped element 305 may have square corners or chamfered corners. The rectangular-shaped element 305 may be a visual representation of a physical, rectangular-shaped card (e.g., a transaction card) associated with an account identifier corresponding to an account or sub-account of a user.

The first UI element also may include a track 310 positioned on the rectangular-shaped element 305. The track 310 may extend linearly between a first end (e.g., a left-most end) and a second end (e.g., a right-most end) of the track 310. Alternatively, the track 310 may extend along any non-linear path (e.g., an arcuate path). The first UI element also may include an interaction element 315 located at the first end of the track 310. The interaction element 315 may be movable (e.g., slidable) between the first end of the track 310 and the second end of the track 310 (e.g., via interaction by the user, in a similar manner as with example 100 described above). As shown by reference number 320, the interaction element 315 may be slidable in either direction along the track 310. Alternatively, the interaction element 315 may be slidable in a single direction along the track 310 (e.g., from the first end to the second end).

The first UI element further may include abstraction elements 325. The abstraction elements 325 may serve as a security feature to hide the account identifier until the user interaction with the interaction element 315 is detected in the prescribed manner. The abstraction elements 325 may be in the form of text (e.g., a message). For example, the message may provide instructions to the user on how to interact with the interaction element 315 (e.g., "SLIDE TO REVEAL"). The particular text and/or message may be customizable by the user (e.g., selecting from a preset list of options). Upon detecting the user interaction with the interaction element 315 (e.g., sliding the interaction element 315 from the first end of the track 310 to the second end), the abstraction elements 325 may be replaced by the account identifier, in a similar manner as with example 100 described above.

As shown in FIG. 4, the first UI element may be similar to the first UI element of example 100. For example, the first UI element, as indicated by a first set of UI data, may include a rectangular-shaped element 405. In some implementations, the rectangular-shaped element 405 may have rounded corners, as shown in FIG. 4. Alternatively, the rectangular-shaped element 405 may have square corners or chamfered corners. The rectangular-shaped element 405 may be a visual representation of a physical, rectangular-shaped card (e.g., a transaction card) associated with an account identifier corresponding to an account or sub-account of a user.

The first UI element may also include an interaction element 410 and abstraction elements 415. The interaction element 410 may be interactable by the user. For example, as shown in FIG. 4, the interaction element 410 may be a button, and the user device may detect a user interaction with the interaction element 410 (e.g., via the touchscreen display of the user device when the user touches or presses the button). Upon detecting the user interaction, the abstraction elements 415, which may serve as a security feature to hide the account identifier until the user interaction with the interaction element 410 is detected, may be replaced by the account identifier, in a similar manner as with example 100 described above.

As indicated above, FIGS. 2-4 are provided as an example. Other examples may differ from what is described with regard to FIGS. 2-4. Additionally, different features of examples 200, 300, and 400 may be combined with each other and/or with the features of example 100.

Figure 5:
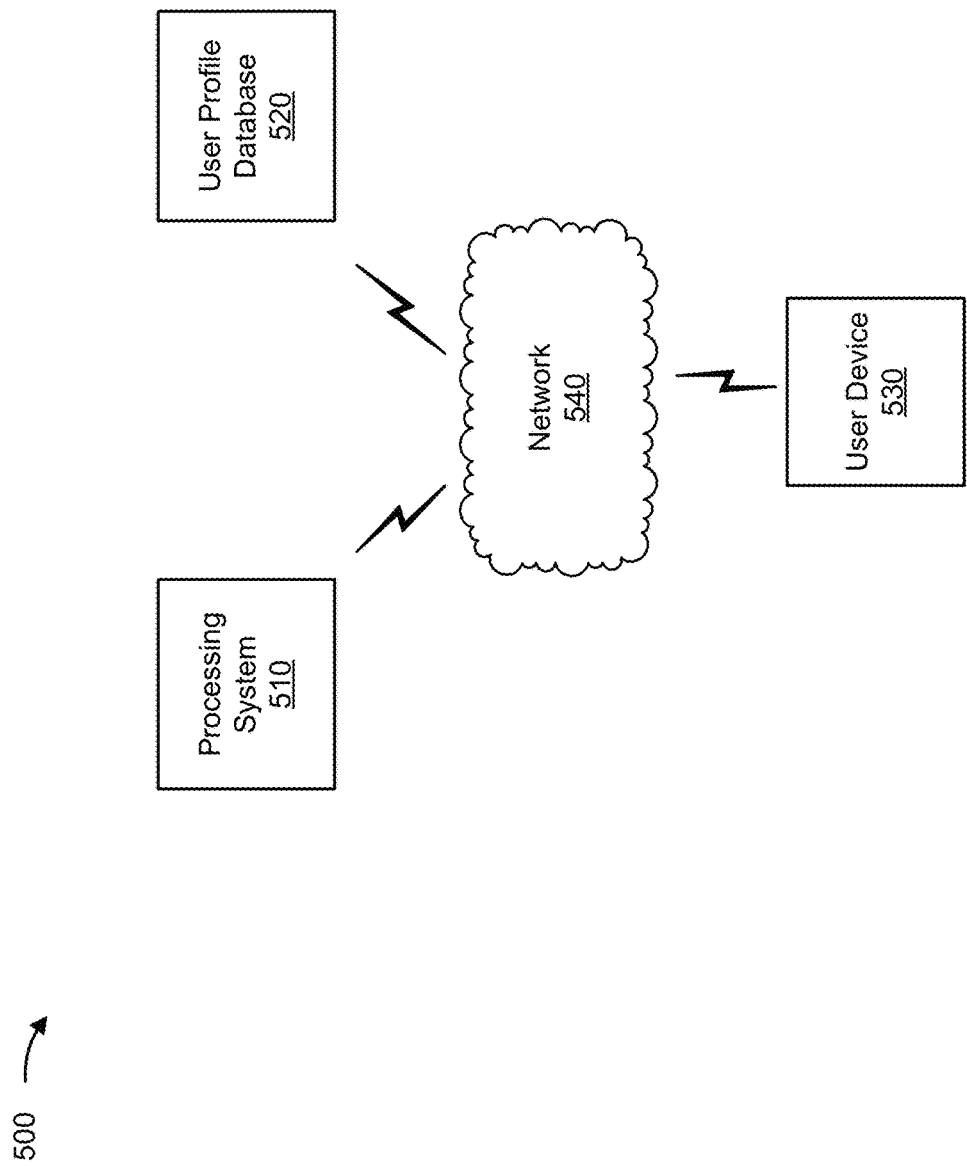
FIG. 5 is a diagram of an example environment in which systems and/or methods described herein may be implemented.

FIG. 5 is a diagram of an example environment 500 in which systems and/or methods described herein may be implemented. As shown in FIG. 5, environment 500 may include a processing system 510, a user profile database 520, a user device 530, and a network 590. Devices of environment 500 may interconnect via wired connections, wireless connections, or a combination of wired and wireless connections.

The processing system 510 includes one or more devices capable of receiving, generating, storing, processing, providing, and/or routing information associated with presentation and control of user interaction with a slider-based user interface element, as described elsewhere herein. The processing system 510 may include a communication device and/or a computing device. For example, the processing system 510 may include a server, such as an application server, a client server, a web server, a database server, a host server, a proxy server, a virtual server (e.g., executing on computing hardware), or a server in a cloud computing system. In some implementations, the processing system 510 includes computing hardware used in a cloud computing environment.

The user profile database 520 includes one or more devices capable of receiving, generating, storing, processing, and/or providing information associated with presentation and control of user interaction with a slider-based user interface element, as described elsewhere herein. The user profile database 520 may include a communication device and/or a computing device. For example, the user profile database 520 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the user profile database 520 may store information associated with an account of a user, as described elsewhere herein.

The user device 530 includes one or more devices capable of receiving, generating, storing, processing, and/or providing information associated with presentation and control of user interaction with a slider-based user interface element, as described elsewhere herein. The user device 530 may include a communication device and/or a computing device. For example, the user device 530 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The network 540 includes one or more wired and/or wireless networks. For example, the network 540 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 540 enables communication among the devices of environment 500.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
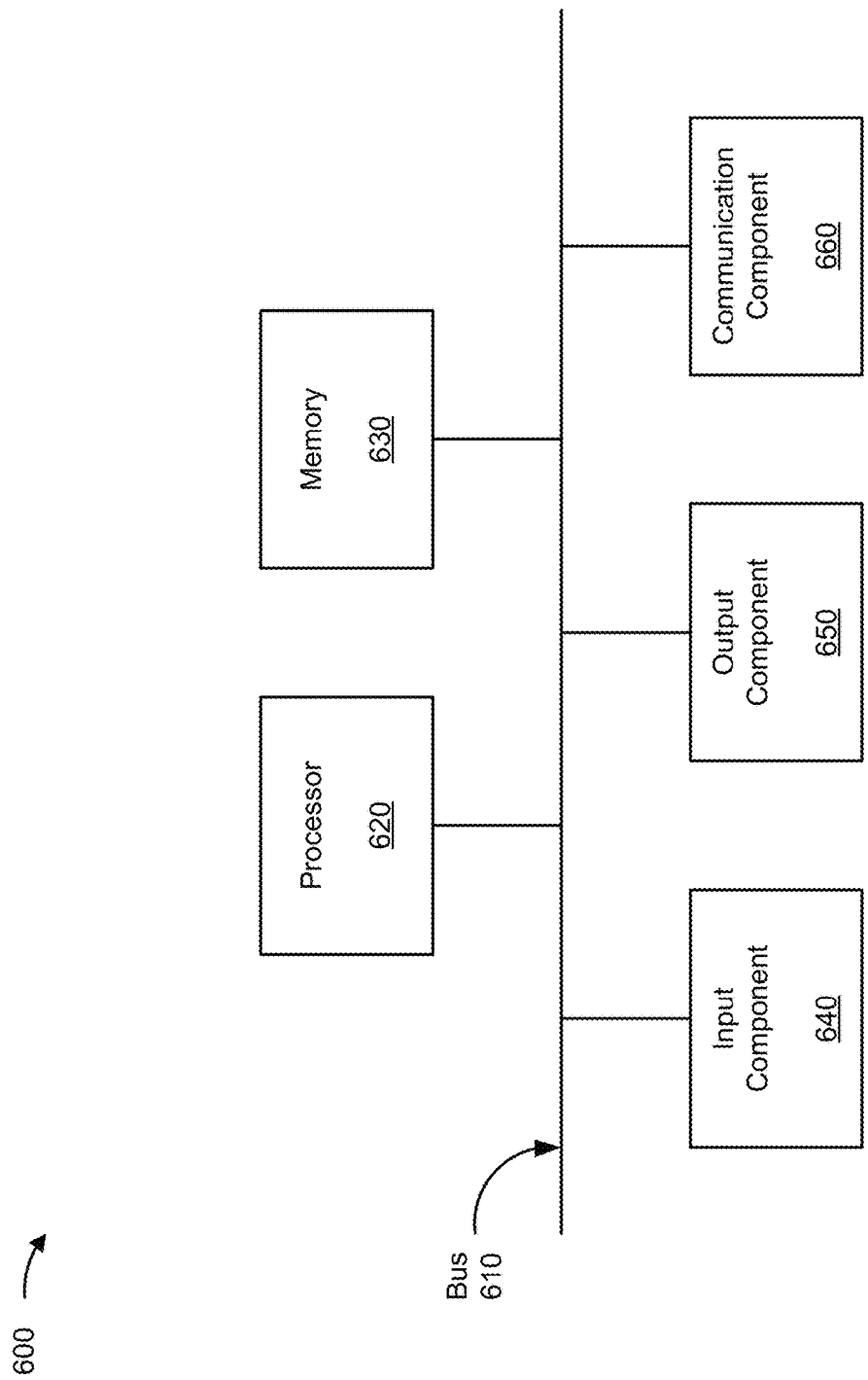
FIG. 6 is a diagram of example components of one or more devices of FIG. 2.

FIG. 6 is a diagram of example components of a device 600, which may correspond to the processing system 510, the user profile database 520, and/or the user device 530. In some implementations, the processing system 510, the user profile database 520, and/or the user device 530 include one or more devices 600 and/or one or more components of device 600. As shown in FIG. 6, device 600 may include a bus 610, a processor 620, a memory 630, an input component 640, an output component 650, and a communication component 660.

Bus 610 includes one or more components that enable wired and/or wireless communication among the components of device 600. Bus 610 may couple together two or more components of FIG. 6, such as via operative coupling, communicative coupling, electronic coupling, and/or electric coupling. Processor 620 includes a central processing unit, a graphics processing unit, a microprocessor, a controller, a microcontroller, a digital signal processor, a field-programmable gate array, an application-specific integrated circuit, and/or another type of processing component. Processor 620 is implemented in hardware, firmware, or a combination of hardware and software. In some implementations, processor 620 includes one or more processors capable of being programmed to perform one or more operations or processes described elsewhere herein.

Memory 630 includes volatile and/or nonvolatile memory. For example, memory 630 may include random access memory (RAM), read only memory (ROM), a hard disk drive, and/or another type of memory (e.g., a flash memory, a magnetic memory, and/or an optical memory). Memory 630 may include internal memory (e.g., RAM, ROM, or a hard disk drive) and/or removable memory (e.g., removable via a universal serial bus connection). Memory 630 may be a non-transitory computer-readable medium. Memory 630 stores information, instructions, and/or software (e.g., one or more software applications) related to the operation of device 600. In some implementations, memory 630 includes one or more memories that are coupled to one or more processors (e.g., processor 620), such as via bus 610.

Input component 640 enables device 600 to receive input, such as user input and/or sensed input. For example, input component 640 may include a touch screen, a keyboard, a keypad, a mouse, a button, a microphone, a switch, a sensor, a global positioning system sensor, an accelerometer, a gyroscope, and/or an actuator. Output component 650 enables device 600 to provide output, such as via a display, a speaker, and/or a light-emitting diode. Communication component 660 enables device 600 to communicate with other devices via a wired connection and/or a wireless connection. For example, communication component 660 may include a receiver, a transmitter, a transceiver, a modem, a network interface card, and/or an antenna.

Device 600 may perform one or more operations or processes described herein. For example, a non-transitory computer-readable medium (e.g., memory 630) may store a set of instructions (e.g., one or more instructions or code) for execution by processor 620. Processor 620 may execute the set of instructions to perform one or more operations or processes described herein. In some implementations, execution of the set of instructions, by one or more processors 620, causes the one or more processors 620 and/or the device 600 to perform one or more operations or processes described herein. In some implementations, hardwired circuitry is used instead of or in combination with the instructions to perform one or more operations or processes described herein. Additionally, or alternatively, processor 620 may be configured to perform one or more operations or processes described herein. Thus, implementations described herein are not limited to any specific combination of hardware circuitry and software.

The number and arrangement of components shown in FIG. 6 are provided as an example. Device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

Figure 7:
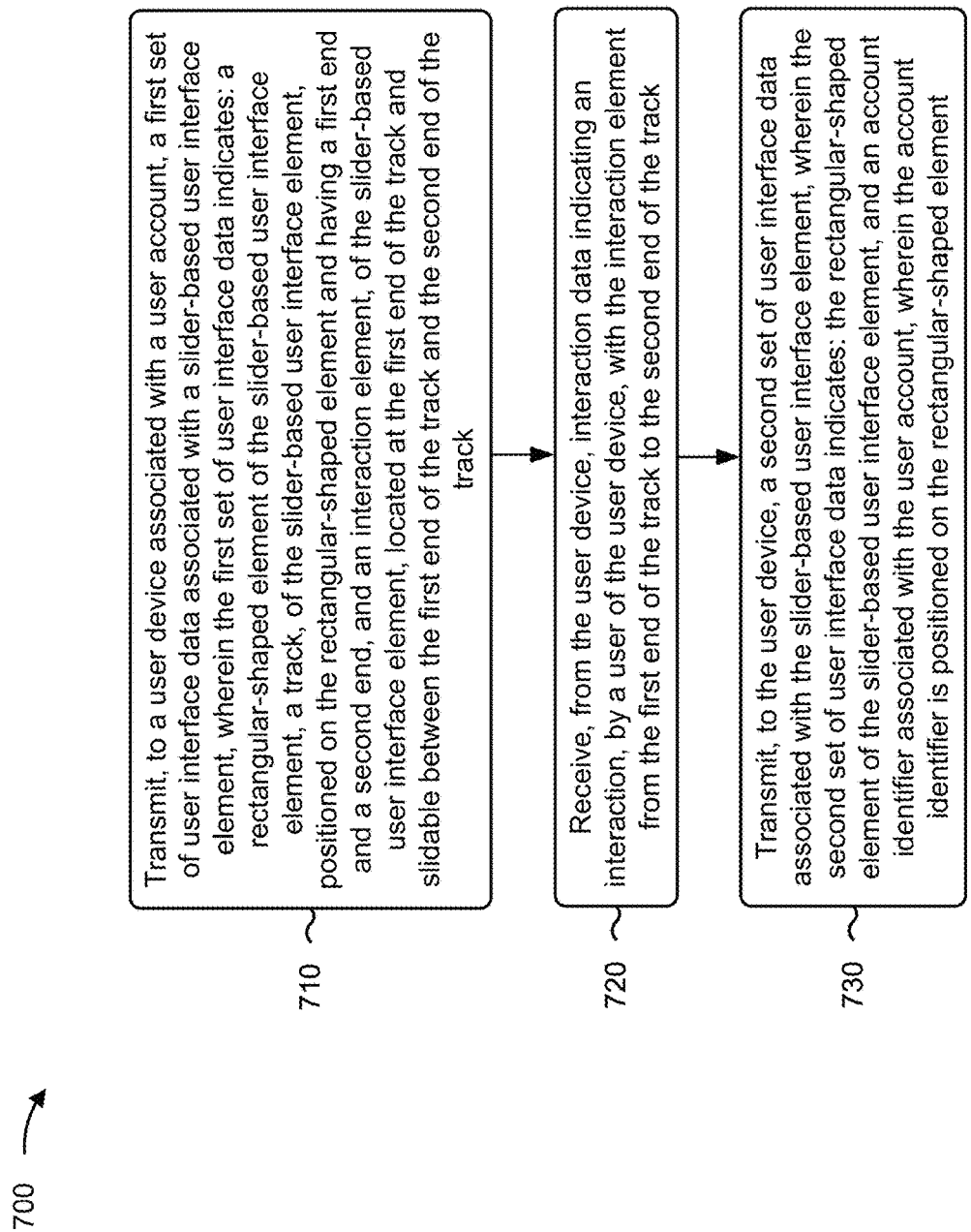
FIGS. 7-8 are flowcharts of example processes relating to presentation and control of user interaction with a slider-based user interface element.

FIG. 7 is a flowchart of an example process 700 associated with presentation and control of user interaction with a slider-based user interface element. In some implementations, one or more process blocks of FIG. 7 may be performed by a system (e.g., processing system 510). In some implementations, one or more process blocks of FIG. 7 may be performed by another device or a group of devices separate from or including the system, such as user device 530. Additionally, or alternatively, one or more process blocks of FIG. 7 may be performed by one or more components of device 600, such as processor 620, memory 630, input component 640, output component 650, and/or communication component 660.

As shown in FIG. 7, process 700 may include transmitting, to a user device associated with a user account, a first set of user interface data associated with the slider-based user interface element, wherein the first set of user interface data indicates: a rectangular-shaped element of the slider-based user interface element, a track, of the slider-based user interface element, positioned on the rectangular-shaped element and having a first end and a second end, and an interaction element, of the slider-based user interface element, located at the first end of the track and slidable between the first end of the track and the second end of the track (block 710). As further shown in FIG. 7, process 700 may include receiving, from the user device, interaction data indicating an interaction, by a user of the user device, with the interaction element from the first end of the track to the second end of the track (block 720). As further shown in FIG. 7, process 700 may include transmitting, to the user device, a second set of user interface data associated with the slider-based user interface element, wherein the second set of user interface data indicates: the rectangular-shaped element of the slider-based user interface element, and an account identifier associated with the user account, wherein the account identifier is positioned on the rectangular-shaped element (block 730).

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel. The process 700 is an example of one process that may be performed by one or more devices described herein. These one or more devices may perform one or more other processes based on operations described herein, such as the operations described in connection with FIGS. 5-6.

Figure 8:
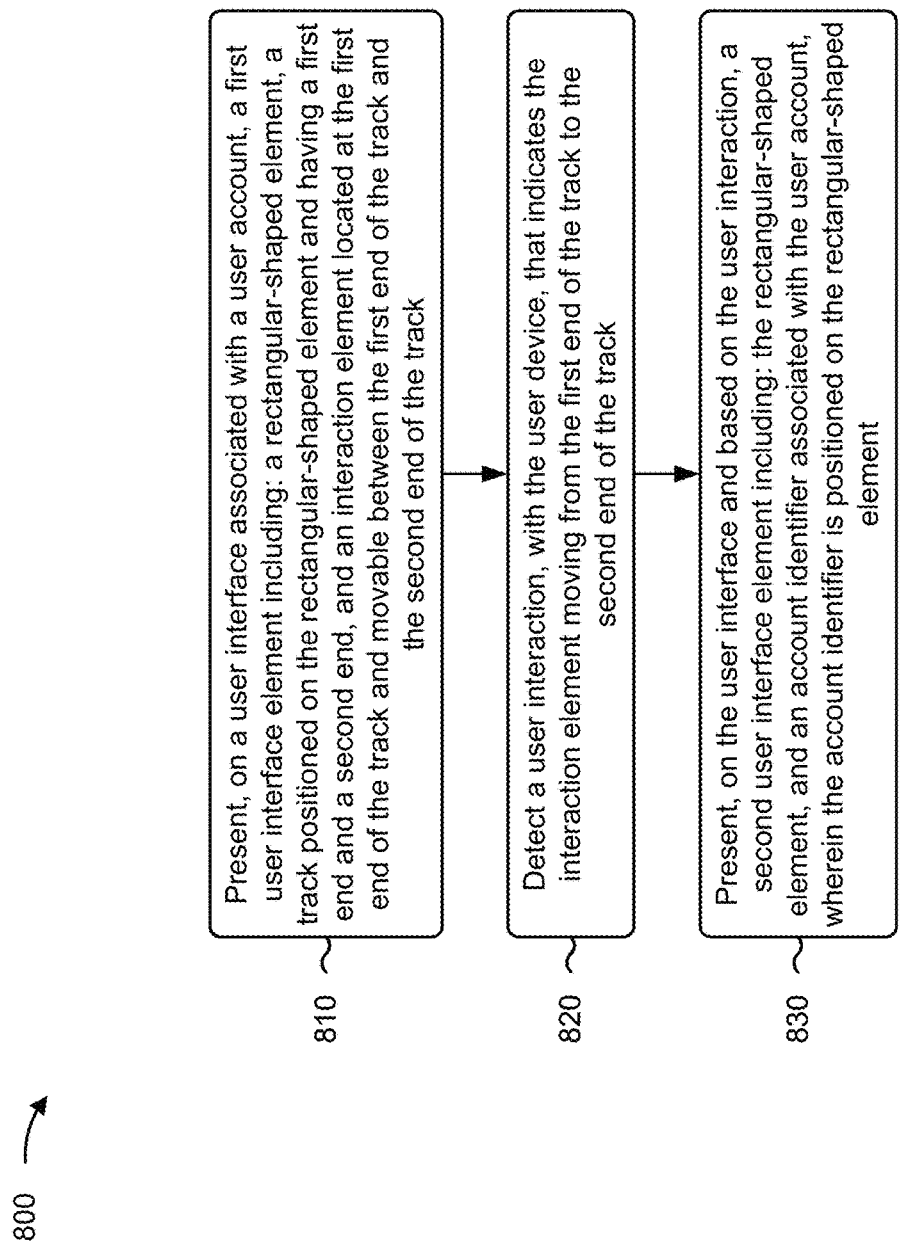

FIG. 8 is a flowchart of an example process 800 associated with presentation and control of user interaction with a slider-based user interface element. In some implementations, one or more process blocks of FIG. 8 may be performed by a user device (e.g., user device 530). In some implementations, one or more process blocks of FIG. 8 may be performed by another device or a group of devices separate from or including the user device, such as processing system 510. Additionally, or alternatively, one or more process blocks of FIG. 8 may be performed by one or more components of device 600, such as processor 620, memory 630, input component 640, output component 650, and/or communication component 660.

As shown in FIG. 8, process 800 may include presenting, on a user interface associated with a user account, a first user interface element including: a rectangular-shaped element, a track positioned on the rectangular-shaped element and having a first end and a second end, and an interaction element located at the first end of the track and movable between the first end of the track and the second end of the track (block 810). As further shown in FIG. 8, process 800 may include detecting a user interaction, with the user device, that indicates the interaction element moving from the first end of the track to the second end of the track (block 820). As further shown in FIG. 8, process 800 may include presenting, on the user interface and based on the user interaction, a second user interface element including: the rectangular-shaped element, and an account identifier associated with the user account, wherein the account identifier is positioned on the rectangular-shaped element (block 830).

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel. The process 800 is an example of one process that may be performed by one or more devices described herein. These one or more devices may perform one or more other processes based on operations described herein, such as the operations described in connection with FIGS. 5-6.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for providing data for presentation of an interaction-based user interface element, the system comprising:
one or more memories; and
one or more processors, coupled to the one or more memories, configured to:
transmit, to a user device associated with a user account, a first set of user interface data associated with the user account, wherein the first set of user interface data indicates an interaction element, of the interaction-based user interface element, positioned on a representation of a transaction-based element and located at a first portion of a track, the interaction element being actionable between the first portion of the track and at least one other portion of the track to provide interaction data associated with indicating an account identifier corresponding to the user account;
receive, from the user device, the interaction data indicating an interaction with the interaction element; and
transmit, to the user device and based on the interaction, a second set of user interface data associated with the interaction-based user interface element, wherein the second set of user interface data indicates:
the representation of the transaction-based element, and
the account identifier.

2. The system of claim 1, wherein a position of the account identifier on the representation of the transaction-based element, indicated by the second set of user interface data, is the same as a position of the track on the representation of the transaction-based element indicated by the first set of user interface data.

3. The system of claim 1, wherein the second set of user interface data further indicates a second interaction element, and wherein the one or more processors are further configured to:
receive, from the user device, interaction data indicating an interaction with the second interaction element; and
transmit, to the user device and based on receiving the interaction data, abstraction data indicating one or more abstraction elements to replace the account identifier indicated by the second set of user interface data.

4. The system of claim 1, wherein the one or more processors are further configured to:
receive, from the user device, selection data indicating a selection of a third party, wherein the user has an account with the third party; and
transmit, to a third party system of the third party, account data indicating the account identifier.

5. The system of claim 1, wherein the one or more processors are further configured to:
initiate, based on receiving the interaction data, an authentication process to authenticate an identity of the user,
wherein the second set of user interface data is transmitted to the user device after the authentication process is completed.

6. The system of claim 5, wherein the account identifier includes a plurality of characters, and the first set of user interface data indicates a plurality of abstraction elements corresponding to the plurality of characters, and wherein the one or more processors are further configured to:
bypass the authentication process if the identity of the user has been authenticated within a threshold amount of time prior to receiving the interaction data; and
reveal a particular character, of the plurality of characters, of the account identifier in the second set of user interface data, when the interaction data indicates the interaction element, via the interaction, has passed a particular abstraction element, of the plurality of abstraction elements, corresponding to the particular character.

7. The system of claim 1, wherein the account identifier includes a plurality of alphanumeric characters, and the first set of user interface data indicates a plurality of symbols corresponding to all of the alphanumeric characters or a subset of the alphanumeric characters,
wherein the plurality of symbols are located along the track, and
wherein the plurality of alphanumeric characters of the account identifier, indicated in the second set of user interface data, are in a same position along the track as a position of the plurality of symbols indicated in the first set of user interface data.

8. The system of claim 1, wherein the account identifier is associated with one or more of:
a use threshold defining a number of interactions with which the account identifier is usable;
one or more third parties with whom the account identifier is usable; or
one or more interaction types or categories of interactions for which the account identifier is usable.

9. The system of claim 1, wherein the representation of the transaction-based element comprises a virtual account card.

10. A method for providing data for presenting an interactive user interface element, comprising:
transmitting, by a system and to a user device, a first set of user interface data associated with the interactive user interface element, wherein the first set of user interface data indicates:
a plurality of abstraction elements positioned on a representation of a transaction-based element, the transaction-based element being associated with one or more account identifiers, and
an interaction element positioned on the representation of the transaction-based element;
receiving, by the system and from the user device, the interaction data indicating an interaction with the interaction element; and
transmitting, by the system and to the user device, based on the interaction data, a second set of user interface data associated with the interactive user interface element, wherein the second set of user interface data indicates:
the representation of the transaction-based element, and
a plurality of alphanumeric characters of the one or more account identifiers to replace the plurality of abstraction elements.

11. The method of claim 10, wherein the first set of user interface data further indicates a track having a plurality of portions, wherein the interaction element is located at a first portion of the track, and
wherein the interaction data indicates the interaction with the interaction element from the first portion of the track to a second portion of the track.

12. The method of claim 10, wherein the plurality of alphanumeric characters includes fifteen or sixteen characters, and the plurality of abstraction elements correspond to all of the fifteen or sixteen characters.

13. The method of claim 10, wherein the interaction element is a button.

14. The method of claim 10, wherein the representation of the transaction-based element comprises a virtual account card.

15. A user device configured to present a slider-based user interface element, comprising:
one or more memories; and
one or more processors, coupled to the one or more memories, configured to:
present, on a user interface associated with a user account, a first user interface element including an interaction element positioned on a representation of a transaction-based element and located at a first portion of a track, the interaction element being actionable between the first portion of the track and at least one other portion of the track in accordance with a user interaction;
detect the user interaction, with the user device, that indicates the interaction element moving from the first portion of the track toward the at least one other portion of the track; and
present, on the user interface and based on the user interaction, a second user interface element including an account identifier associated with the user account, wherein the account identifier is positioned on the representation of the transaction-based element.

16. The user device of claim 15, wherein a position of the account identifier on the representation of the transaction-based element in the second user interface element is the same as a position of the track on the representation of the transaction-based element in the first user interface element.

17. The user device of claim 15, wherein the second user interface element indicates a second interaction element, and wherein the one or more processors are further configured to:
detect a second user interaction, with the user device, that indicates the second interaction element; and
create a copy of data indicating the account identifier based on detecting the second user interaction that indicates the second interaction element.

18. The user device of claim 15, wherein the account identifier includes a plurality of characters, and the first user interface element includes a plurality of abstraction elements on the representation of the transaction-based element and corresponding to the plurality of characters, and
wherein, in the second user interface element, the plurality of characters replaces the plurality of abstraction elements on the representation of the transaction-based element.

19. The user device of claim 18, wherein the second user interface element indicates a second interaction element, and wherein the one or more processors are further configured to:
detect a second user interaction, with the user device, that indicates the second interaction element; and
replace, based on the second user interaction, the plurality of characters on the representation of the transaction-based element with the plurality of abstraction elements.

20. The user device of claim 15, wherein the one or more processors are configured to detect the user interaction while the interaction element is in progress between the first portion of the track and a different portion of the track.

* * * * *